(12) United States Patent
Maier et al.

(10) Patent No.: US 7,286,231 B2
(45) Date of Patent: Oct. 23, 2007

(54) METHOD AND APPARATUS FOR PEAK COMPENSATION IN AN OPTICAL FILTER

(75) Inventors: John S. Maier, Pittsburgh, PA (US); Jason H. Neiss, Pittsburgh, PA (US); Shona Stewart, Pittsburgh, PA (US)

(73) Assignee: ChemImage Corp., Pittsburgh, PA (US)

( * ) Notice: Subject to any disclaimer, the term of this patent is extended or adjusted under 35 U.S.C. 154(b) by 341 days.

(21) Appl. No.: 10/879,630

(22) Filed: Jun. 30, 2004

(65) Prior Publication Data

US 2006/0001881 A1  Jan. 5, 2006

(51) Int. Cl.
*G01J 3/51* (2006.01)
*G01N 21/65* (2006.01)

(52) U.S. Cl. ...................... 356/416; 356/301
(58) Field of Classification Search ............ 356/301, 356/416, 417, 418, 419
See application file for complete search history.

(56) References Cited

U.S. PATENT DOCUMENTS

| | | | |
|---|---|---|---|
| 4,660,151 A | 4/1987 | Chipman et al. | |
| 4,701,838 A | 10/1987 | Swinkels et al. | |
| 4,766,551 A | 8/1988 | Begley | |
| 4,885,697 A | 12/1989 | Hubner | |
| 5,072,338 A | 12/1991 | Hug et al. | |
| 5,121,337 A | 6/1992 | Brown | |
| 5,121,338 A | 6/1992 | Lodder | |
| 5,124,932 A | 6/1992 | Lodder | |
| 5,311,445 A | 5/1994 | White | |
| 5,324,567 A | 6/1994 | Bratchley et al. | |
| 5,481,476 A | 1/1996 | Windig | |
| 5,606,164 A | 2/1997 | Price et al. | |
| 5,610,836 A | 3/1997 | Alsmeyer et al. | |
| 5,710,713 A | 1/1998 | Wright et al. | |
| 5,751,415 A | 5/1998 | Smith et al. | |
| 5,822,219 A | 10/1998 | Chen et al. | |
| 5,864,397 A | 1/1999 | Vo-Dinh | |
| 6,002,476 A | 12/1999 | Treado | |
| 6,008,888 A | 12/1999 | Nottke et al. | |
| 6,239,904 B1 | 5/2001 | Serfling et al. | |
| 6,485,981 B1 | 11/2002 | Fernandez | |
| 6,504,616 B1* | 1/2003 | Haber et al. | 356/519 |
| 6,549,861 B1 | 4/2003 | Mark et al. | |
| 6,584,413 B1 | 6/2003 | Keenan et al. | |

(Continued)

OTHER PUBLICATIONS

Conti, S., et al., "Traces of Polymethylsiloxane in case histories of rape: technique for detection," Elsvier Science Ireland Ltd, Forensic Science International, Jan. 1995, pp. 121-128.

(Continued)

*Primary Examiner*—F. L. Evans
(74) *Attorney, Agent, or Firm*—Duane Morris LLP (57) ABSTRACT

In one embodiment the disclosure relates to a method and a system for determining the corrected wavelength of a photon scattered by a sample. The method includes the steps of determining a wavelength of a photon scattered from a sample exposed to illuminating photons and passed through a tunable filter and correcting the determined wavelength of the photon as a function of the temperature of the tunable filter and as a function of the bandpass set point of the tunable filter. The step of correcting the determined wavelength can further include determining an offset and adding the offset to the determined wavelength of the photon.

20 Claims, 12 Drawing Sheets

U.S. PATENT DOCUMENTS

2006/0013500 A1* 1/2006 Maier et al. ............... 382/254

OTHER PUBLICATIONS

Lee, G.S.H., et al., "A Methodology Based on NMR Spectroscopy for the Forensic Analysis of Condoms," St. Andrews Centre for Advanced Materials, pp. 808-821.

Maynard, P., et al., "A protocol for the forensic analysis of condom and personal lubricants found in sexual assault cases," Forensic Science International, 124 (2001), pp. 140-156.

Stoilovic, M., et al., "The Application of Light in Forensic Science & A Modern Approach to Fingerprint Detection and Enhancement," Australian Federal Police, AFP Workshop Manual, Oct. 2000.

Roux, C., et al., "Evaluation of 1,2-Indanedione and 5,6-Dimethoxy-1,2-Indanedione for the Detection of Latent Fingerprints on Porous Surfaces," Journal of Forensic Sciences, vol. 45(4), 2000, pp. 761-769.

Roux, C., et al., "A study to investigate the evidential value of blue and black ballpoint pen inks in Australia," Forensic Science International, 101 (1999), pp. 167-176.

Mazzella, W.D., et al., "Classification and Identification of Photocopying Toners by Diffuse Reflectance Infrared Fourier Transform Spectroscopy (DRIFTS): I. Preliminary Results," Journal of Forensic Sciences, JFSCA, vol. 36, No. 2, Mar. 1991, pp. 449-465.

Mazzella, W.D., et al., "Classification and Identification of Photocopying Toners by Diffuse Reflectance Infrared Fourier Transform Spectroscopy (DRIFTS): II. Final Report," Journal of Forensic Sciences, JFSCA, vol. 36, No. 3, May 1991, pp. 820-837.

Brunelle, R.L., "Questioned Document Examination," Bureau of Alcohol, Tobacco, and Firearms, U.S. Treasury Department, 1982.

Robertson, J., et al., "The Persistence of Textile Fibres Transferred During Simulated Contacts," Journal of Forensic Sciences, vol. 22, No. 4, Oct. 1982, pp. 353-360.

Gaudette, B.D., "The Forensic Aspects of Textile Fiber Examination," Central Forensic Laboratory, Royal Canadian Mounted Police.

Pounds, C.A., et al., "The Transfer of Fibres between Clothing Materials During Simulated Contacts and their Persistence During Wear: Part I—Fibre Transference," Journal of Forensic Sciences, vol. 15, 1975, pp. 17-27.

Pounds, C.A., et al., "The Transfer of Fibres between Clothing Materials During Simulated Contacts and their Persistence During Wear: Part II—Fibre Persistence," Journal of Forensic Sciences, vol. 15, 1975, pp. 29-37.

Maynard, P., "Adhesive Tape Analysis: Establishing the Evidential Value of Specific Techniques," Journal of Forensic Sciences, vol. 46(2), 2001, pp. 280-287.

Caetano, M.R., et al., "Evaluation of the importance of non-linear spectral mixing in coniferous forests," EUROPTO Conference on Remote Sensing for Agriculture, Ecosystems, and Hydrology, Barcelona, Spain, Sep. 1998.

Rasmussen, G.T., et al., "Library Retrieval of Infrared Spectra Based on Detailed Intensity Information," Applied Spectroscopy, vol. 33, No. 4, 1979.

Guilment, J., et al., "Infrared Chemical Micro-Imaging Assisted by Interactive Self-Modeling Multivariate Analysis," Applied Spectroscopy, vol. 48, No. 3, 1994.

Engman, E.T., "Remote Sensing for Agriculture, Ecosystems, and Hydrology," Proceedings of SPIE EUROPTO Series, vol. 3499, Sep. 22-24, 1998.

Press, W.H., et al., Numerical Recipes in C, The Art of Scientific Computing, $2^{nd}$ ed., Cambridge, NY: Cambridge University Press, 1992.

Malinowski, E.R., Factor Analysis in Chemistry, $2^{nd}$ ed., New York, NY: John Wiley & Sons, Inc., 1991.

* cited by examiner

METHOD AND APPARATUS FOR PEAK COMPENSATION IN AN OPTICAL FILTER

The instant specification relates to application Ser. Nos. 10/879,663 and 10/879,632 filed concurrently herewith and entitled, respectively, System and Method for Spectroscopy and Imaging and Method and Apparatus for Spectral Modulation Compensation. Each of said applications is incorporated herein in its entirety for background information. background information.

BACKGROUND

Spectroscopic imaging combines digital imaging and molecular spectroscopy techniques, which can include, Raman scattering, fluorescence, photoluminescence, ultraviolet, visible and infrared absorption spectroscopies. When applied to the chemical analysis of materials, spectroscopic imaging is commonly referred to as chemical imaging. Instruments for performing spectroscopic (i.e. chemical) imaging typically comprise image gathering optics, focal plane array imaging detectors and imaging spectrometers.

In general, the sample size determines the choice of image gathering optic. For example, a microscope is typically employed for the analysis of submicron to millimeter spatial dimension samples. For larger objects, in the range of millimeter to meter dimensions, macro lens optics are appropriate. For samples located within relatively inaccessible environments, flexible fiberscopes or rigid borescopes can be employed. For very large scale objects, such as planetary objects, telescopes are appropriate image gathering optics.

For detection of images formed by the various optical systems, two-dimensional, imaging focal plane array (FPA) detectors are typically employed. The choice of FPA detector is governed by the spectroscopic technique employed to characterize the sample of interest. For example, silicon (Si) charge-coupled device (CCD) detectors, a type of FPA, are typically employed with visible wavelength fluorescence and Raman spectroscopic imaging systems, while indium gallium arsenide (InGaAs) FPA detectors are typically employed with near-infrared spectroscopic imaging systems.

A variety of imaging spectrometers have been devised for spectroscopic imaging systems. Examples include, without limitation, grating spectrometers, filter wheels, Sagnac interferometers, Michelson interferometers and tunable filters such as acousto-optic tunable filters (AOTFs) and liquid crystal tunable filters (LCTFs).

A number of imaging spectrometers, including AOTFs and LCTFs are polarization sensitive, passing one linear polarization and rejecting the orthogonal linear polarization. As a result, theoretical efficiency is 50%. Practical efficiency is reduced due to scattering losses, imperfect spectrometer action, absorption losses in polarizing optics, etc. Practical efficiency of 30% peak transmittance or less is more typical. Previous spectroscopic imaging instruments accepted the optical losses associated with polarization sensitive imaging spectrometers.

The efficiency of the of imaging spectrometers is also a function of the system-specific noise caused by background light, room temperature and the wavelength of the scattered light. For example, the LCTF has a wavelength dependent transmission modulation which affect's the accuracy and the efficiency of measuring sharp Raman bands with weak Raman scatterers. Experiments with certain LCTF devices show complicated interactions arising in the material and structure of the imaging devices produce a spatial and spectral modulation of light coming through the imaging device. The modulation produces an apparent background signal that is not uniform and masks the real signal. Another example is temperature. It has been found that the room temperature can cause a band pass shift in the wavelength of the collected scattered photons thereby masking the Raman signal or resulting in an inaccurate as the Raman signal. This effect is specially pronounced in material having weak Raman scattering or samples having a low concentration of the material being studied. Because the ability to detect Raman vibrational features on a uniform background is critical to identifying small signal levels, the background noise can have a detrimental affect on the spectral detection.

SUMMARY OF THE DISCLOSURE

According to one embodiment, the disclosure relates to a method for correcting a determined wavelength of a photon, by determining a wavelength of a photon scattered from a sample exposed to illuminating photons and passed through a tunable filter and correcting the determined wavelength of said one photon as a function of the temperature of the tunable filter and as a function of the bandpass set point of the tunable filter. A system for implementing an embodiment of the disclosure includes a photon detection device for determining a wavelength of a photon scattered from a sample exposed to illuminating photons and passed through a tunable filter and a processor programmed to correct the determined wavelength of said one photon as a function of the temperature of the tunable filter and as a function of the bandpass set point of the tunable filter. The photon detection device may be a charge-coupled device and a liquid crystal filter can be used as a tunable filter.

In another embodiment, the disclosure relates to a method for correcting a determined wavelength of a photon by receiving at a tunable filter photons scattered by a sample when exposed to illuminating photons and passing ones of said scattered photons that have a wavelength within a predetermined wavelength band; for one of the passed scattered photons, determining a wavelength of the one photon at a photon detecting device and correcting the determined wavelength of said one photon as a function of the temperature of the tunable filter and as a function of the bandpass set point of the tunable filter. A system for implementing an embodiment of the disclosure includes a tunable filter for receiving photons scattered by a sample when exposed to illuminating photons and passing ones of said scattered photons that have a wavelength within a predetermined wavelength band; a photon detection device for determining a wavelength of one of said passed scattered photons; and a processor programmed to correct the determined wavelength of said one photon as a function of the temperature of the tunable filter and as a function of the bandpass set point of the tunable filter. The processor can be programmed with a first set of instructions to determine an offset and a second set of instructions for adding the offset to the determined wavelength of the photon.

In another embodiment, the disclosure is directed to a method for correcting a determined wavelength of a photon, the method includes the steps of receiving at a tunable filter photons scattered by a sample when exposed to illuminating photons and blocking ones of the scattered photons that have a wavelength that is not within a predetermined wavelength band; for the scattered photons not blocked by the tunable filter, determining a wavelength of the photon at a photon detecting device; and correcting the determined wavelength of the photon as a function of the temperature of the tunable filter and as a function of the bandpass set point of the tunable filter. A system for implementing an embodiment of the disclosure includes a tunable filter for receiving photons scattered by a sample when exposed to illuminating photons and blocking the scattered photons that have a wavelength not within a predetermined wavelength band; a photon detecting device for determining a wavelength of one of the scattered photons that is not blocked by said tunable filter; and a processor programmed to correct the determined wavelength of the photon as a function of the temperature of the tunable filter and as a function of the bandpass set point of the tunable filter In still another embodiment, the disclosure relates to a method for determining a corrected wavelength of a photon scattered from a sample by exposing a sample to illuminating photons; receiving at a tunable filter photons scattered by the sample; detecting at a photon detecting device one of the scattered photons that is in a predetermined wavelength band; determining a wavelength of the detected photon; and modifying the determined wavelength as a function of the temperature of the tunable filter and as a function of the bandpass set point of the tunable filter to thereby determine a corrected wavelength of the detected photon. A system for implementing an embodiment of the disclosure includes a sample exposed to illuminating photons; a tunable filter which receives photons scattered by the sample; a photon detecting device which detects one of the scattered photons that is in a predetermined wavelength band; a processor programmed to determine a wavelength of the detected photon and to modify the determined wavelength as a function of the temperature of the tunable filter and as a function of the bandpass set point of the tunable filter to thereby determine a corrected wavelength of the detected photon.

DETAILED DESCRIPTION

The embodiments disclosed herein enable more accurate detection and clearer images from spectroscopic imaging than conventionally possible. Application of Raman spectroscopy with certain biomedical samples including cells, tissues, bacteria, viruses and other biological entities are temperature sensitive. The embodiments disclosed herein enable detecting such samples while considering the temperature effects on the LCTF.

Virtually all spectral imaging filters such as AOTF, LCTF, AOF depend on the optical properties and transmission of light through one or more optical devices in order to produce the desired filtering effect. The filters have complex internal configuration which affects transmission of light through the device. It has been found that the filter performance is highly temperature dependent. Although the imaging filters are designed to minimize such aberrations, residual effects remain which limit the use of these filters for sensitive applications.

Figure 1:
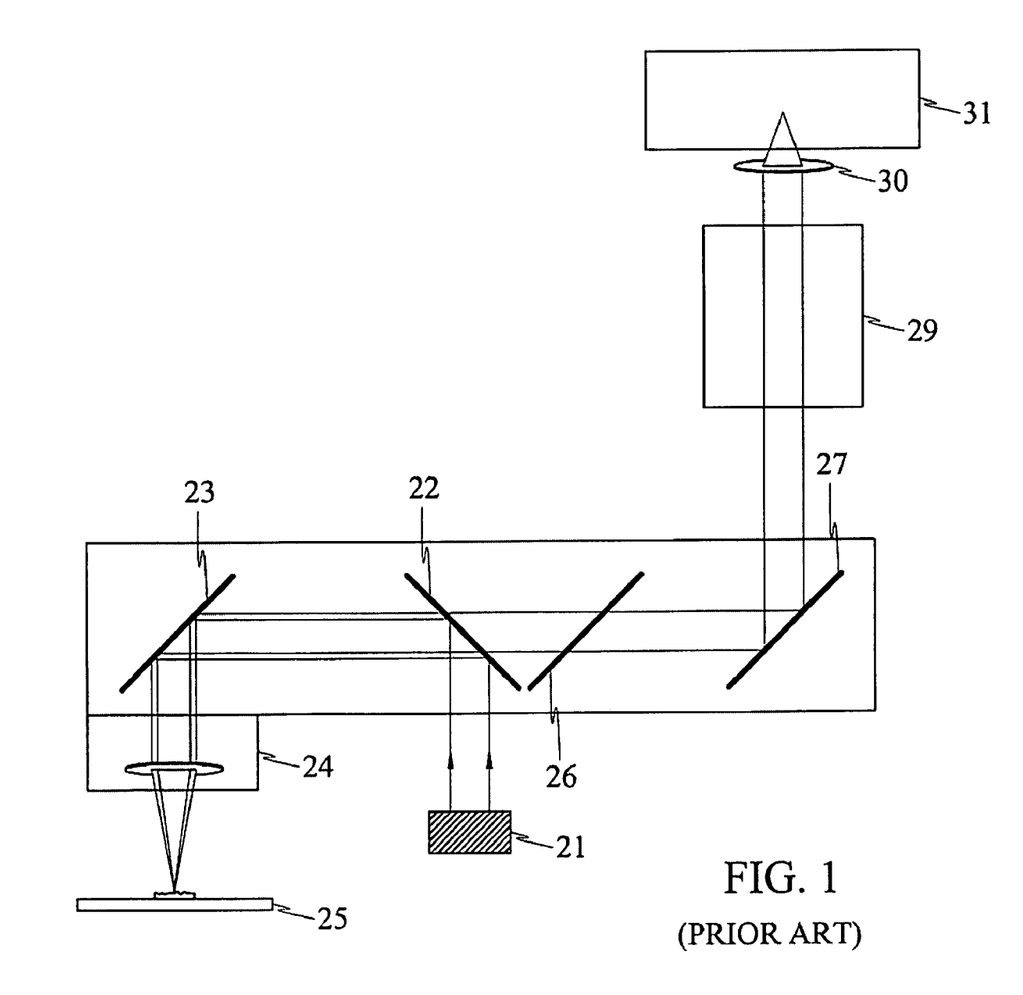
FIG. 1 is a schematic representation of a conventional Raman imaging system.

FIG. 1 is a schematic representation of a conventional Raman imaging system. Referring to FIG. 1, sample 25 is placed on a slide within the purview of objective lens 24. Light source 21 (i.e., laser) provides illumination to sample 25 vis-à-vis beam-splitter 22 and mirror 23. Mirror 23 is also positioned to receive and redirect the sample's image in the form of scattered photons emanating from sample 25 to mirror 27. Beam-splitter 22 may include a 50/50 beam-splitter, a dielectric interference, a dichroic beam-splitter or a holographic optical filter. Optionally laser rejection filter 26 may be placed between beam-splitter 22 and mirror 27 to remove the laser light while transmitting other wavelengths of the optical beam directed through beamsplitter device 22. Laser rejection filter 26 may include a dielectric interference filter, a holographic optical filter or a rugate optical filter. The scattered photons are then directed to tunable filter 28 and then to the focal plane array (FPA) device 31 through lens 30. The FPA may include silicon charge-coupled device (CCD) detector, charge-injection device (CID) detector or infrared FPA. The light entering tunable filter 29 (e.g., LCTF) is processed through the filter. Experiments with certain LCTF devices show that the spectral image processed by the filter is temperature sensitive.

Figure 2:
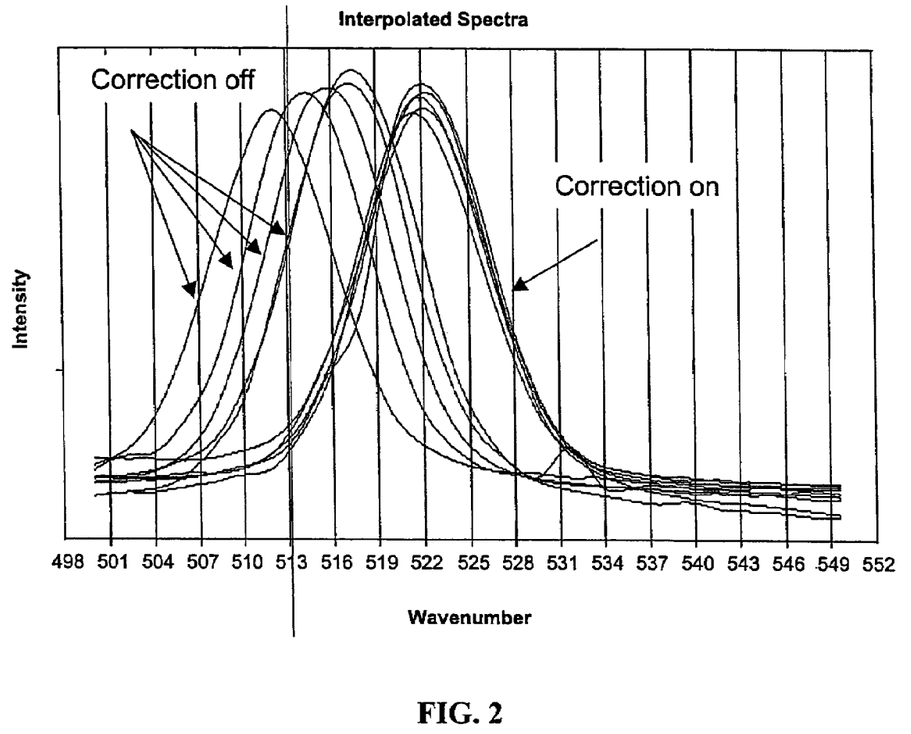
FIG. 2 shows the effect of temperature correction on LCTF bandpass drift.

FIG. 2 shows the effect of temperature correction on LCTF bandpass drift. Specifically, FIG. 2 shows interpolated spectra from LCTF-based Raman imaging of silicon wafer at several temperatures during natural fluctuations over the course of testing at a laboratory. It can be seen from FIG. 2 that the bandbass does not shift significantly with temperature when the temperature-correction according to the principles of the disclosure are activated. However, when temperature-correction is off, the bandpass drifts significantly with temperature. Over the course of a two-hour study ambient temperature variation of 22.00-24.36° C. was recorded. It is evident from FIG. 2 that the LCTF devices are sensitive to temperature. The calibration procedures implemented by the manufacturer do not address this problem. A method and system are disclosed herein to improve Raman imaging measurements in view of the temperature sensitivity of the filter device.

Figure 3:
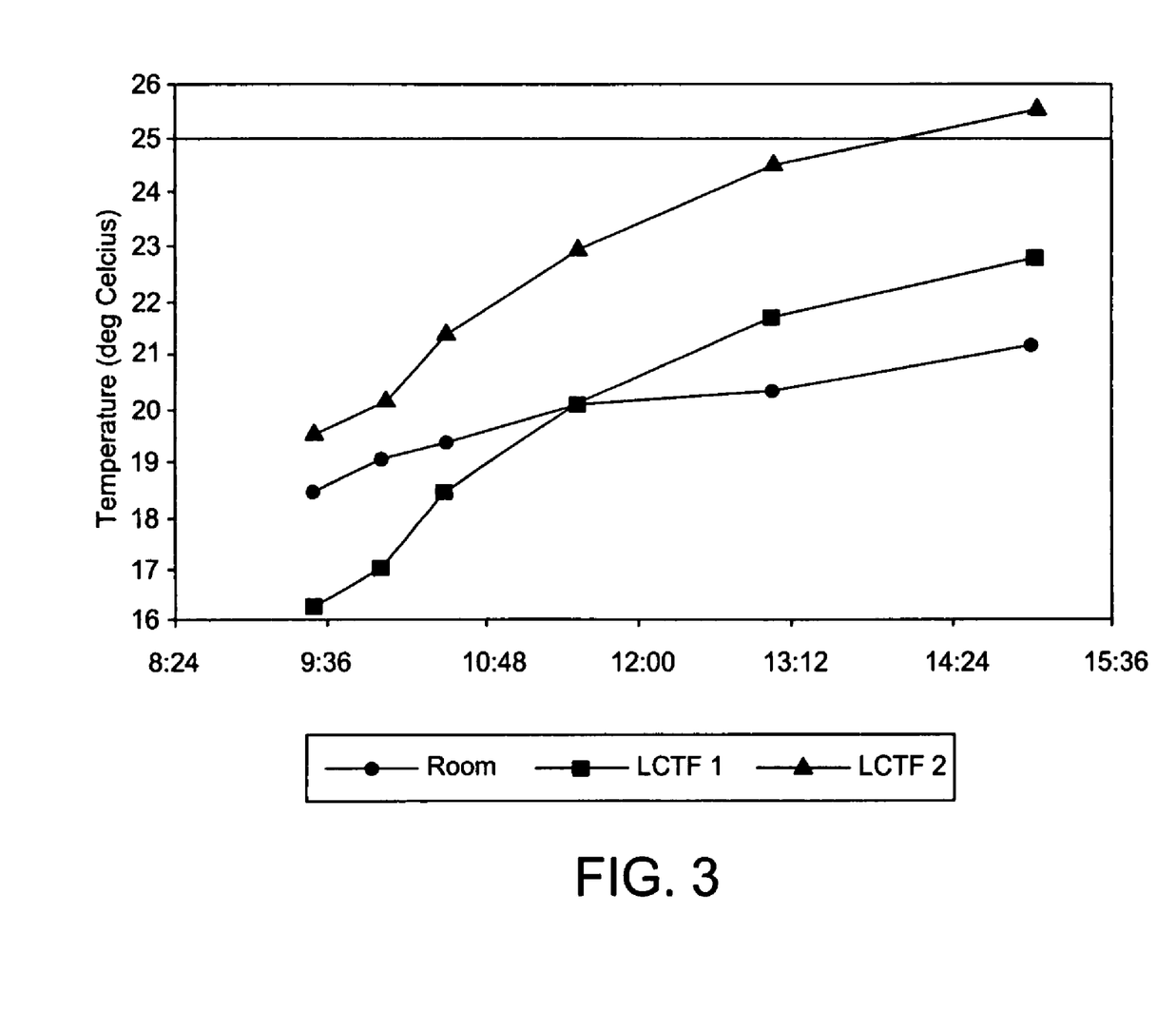
FIG. 3 shows temperature variation over the course of an experiment.
Figure 4:
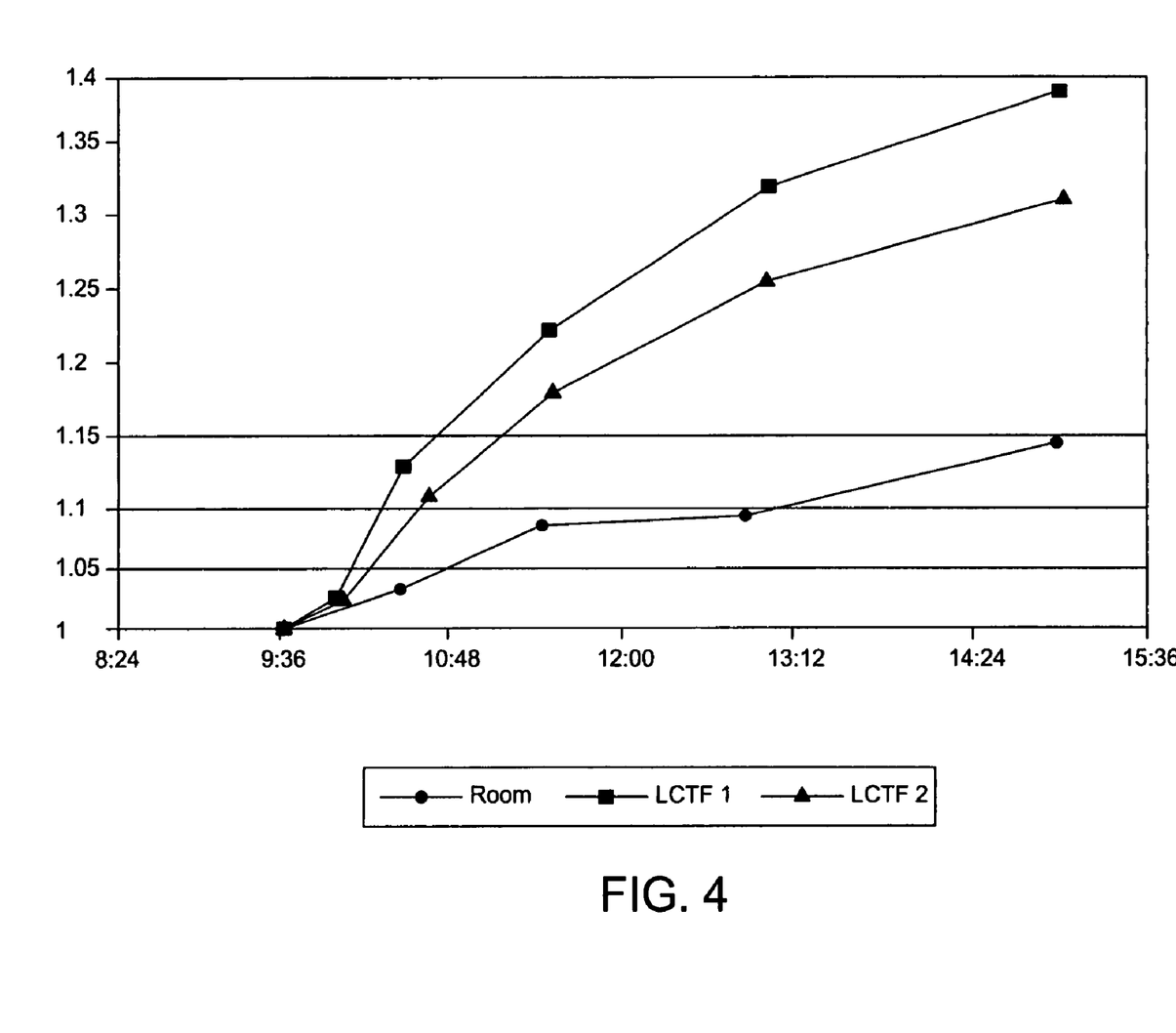
FIG. 4 shows the room temperature and LCTF temperature normalized for comparison.

FIG. 3 shows the temperature of the laboratory and the temperature of two LCTF devices over the course of an experiment. It can be seen from FIG. 3 that the temperatures of the two LCTF are almost 3 degrees apart. The temperature difference can be due to faulty internal temperature sensors or due to device overheating. The temperature fluctuation of the LCTF over the course of the experiment is more than the change in temperature of the room. The relative changes of temperature are consistent with heating in the LCTF either from resistive dissipation or actual light absorption by the filter. FIG. 4 shows the room temperature and LCTF temperature of FIG. 3 normalized for comparison. FIG. 4 more accurately reflects the percent of change due to temperature.

Figure 5:
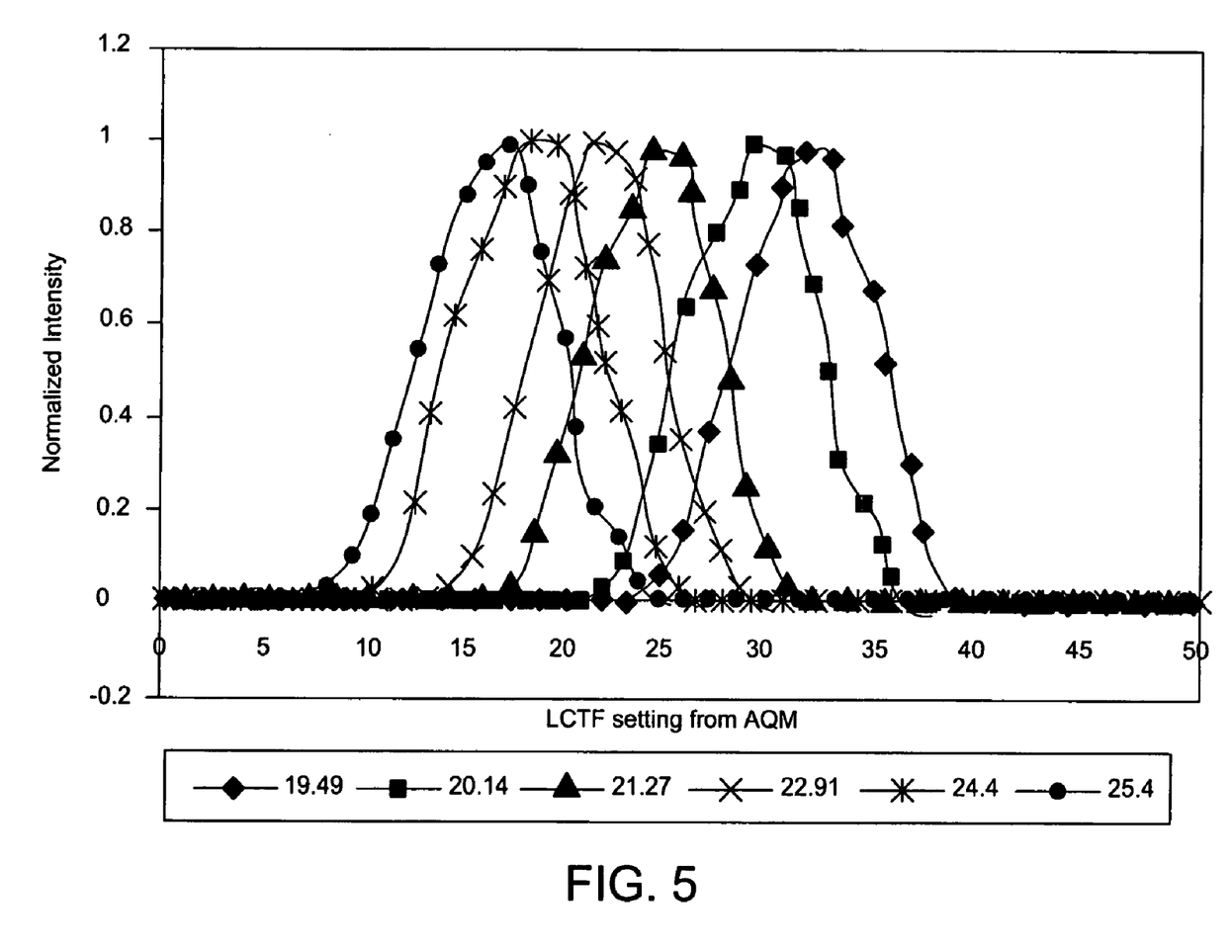
FIG. 5 shows the temperature effect on center bandpass filter.

The temperature fluctuations shown in FIGS. 3 and 4 have a large effect on the actual center bandpass of the filter. This can be demonstrated by using the LCTF to take an image of the laser spot reflecting from a sample of acetaminophen. FIG. 5 shows the temperature effect on center bandpass filter; namely, FIG. 5 shows the observed laser line at various temperatures of the LCTF filter.

Figure 6:
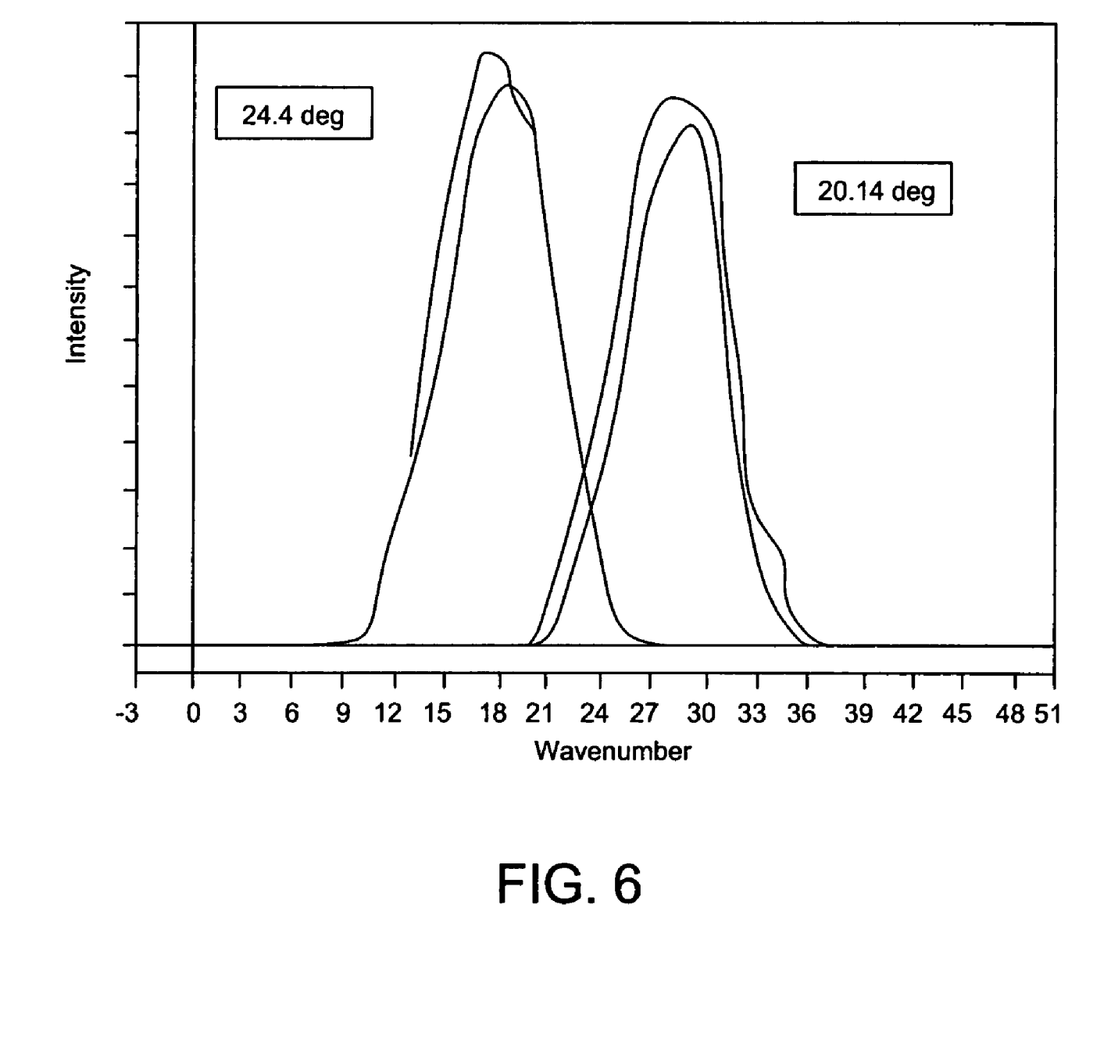
FIG. 6 shows the minimal effect of recalibration as compared to shift caused by temperature change.

While it may appear that a recalibration procedure should correct the temperature effect observed on the LCTF, experiments show otherwise. FIG. 6 shows the minimal effect of recalibration as compared to shift caused by temperature change. At each temperature an image was taken, the recalibration procedure was run and another image was acquired immediately. Although the recalibration procedure changes the bandpass center by some degrees, it is much less than the variability due to the overall temperature change reported by the temperature sensor inside the LCTF. Referring to FIG. 6, it can be seen that laser line appears at shifts of about 16-30 wave numbers. Such variability makes interpretation of Raman shift challenging and shows that a mere recalibration of the device would not accurately reflect the problem.

Figure 7:
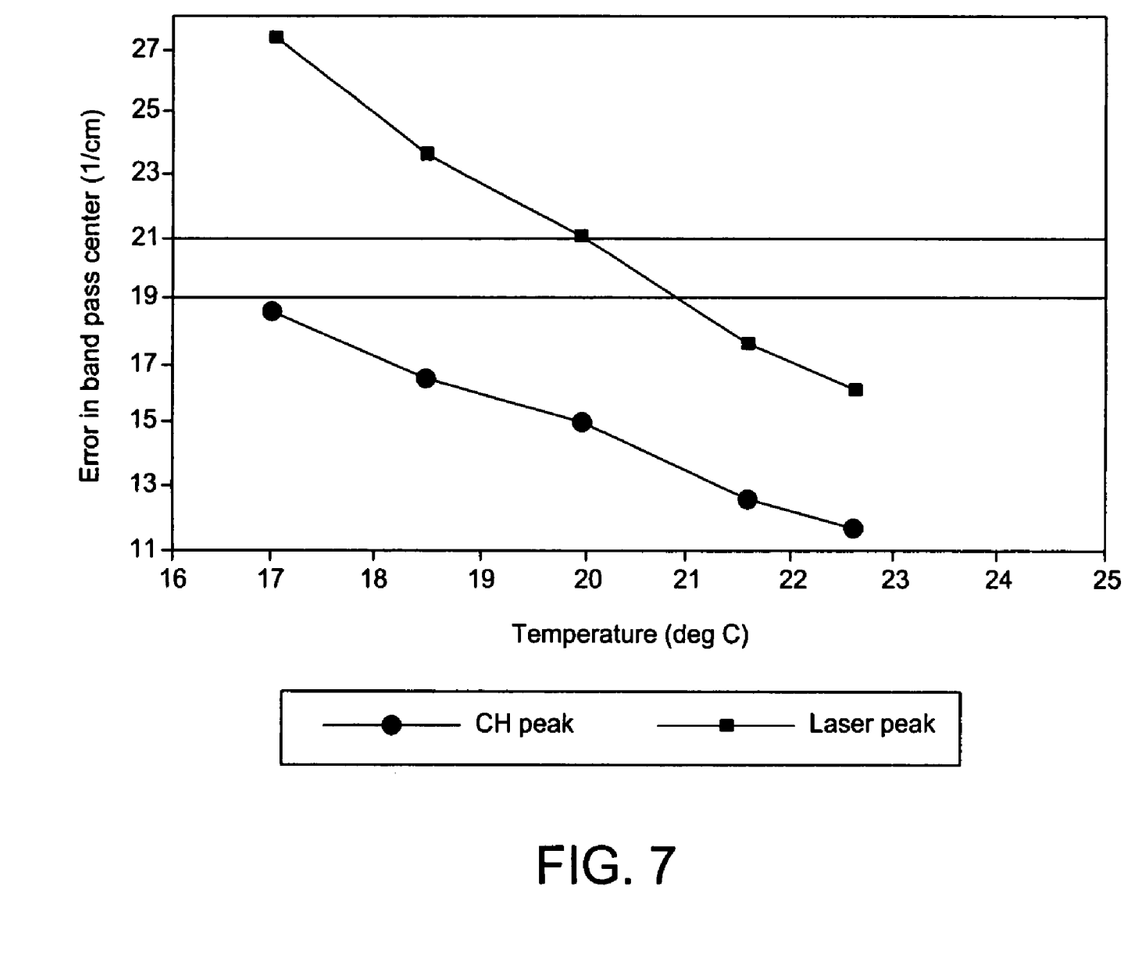
FIG. 7 shows the measured peak position changes as a function of temperature.

FIG. 7 shows the measured peak position changes as a function of temperature. In addition to the laser line, the data in this experiment included a CH peak from an acetaminophen sample. This shows that shift is not the same over the entire free spectral range of the filter. This and other experiments suggest that the bandpass offset (the difference between the desired bandpass and the actual bandpass) are a function of temperature as well as the wavelength.

Figure 8:
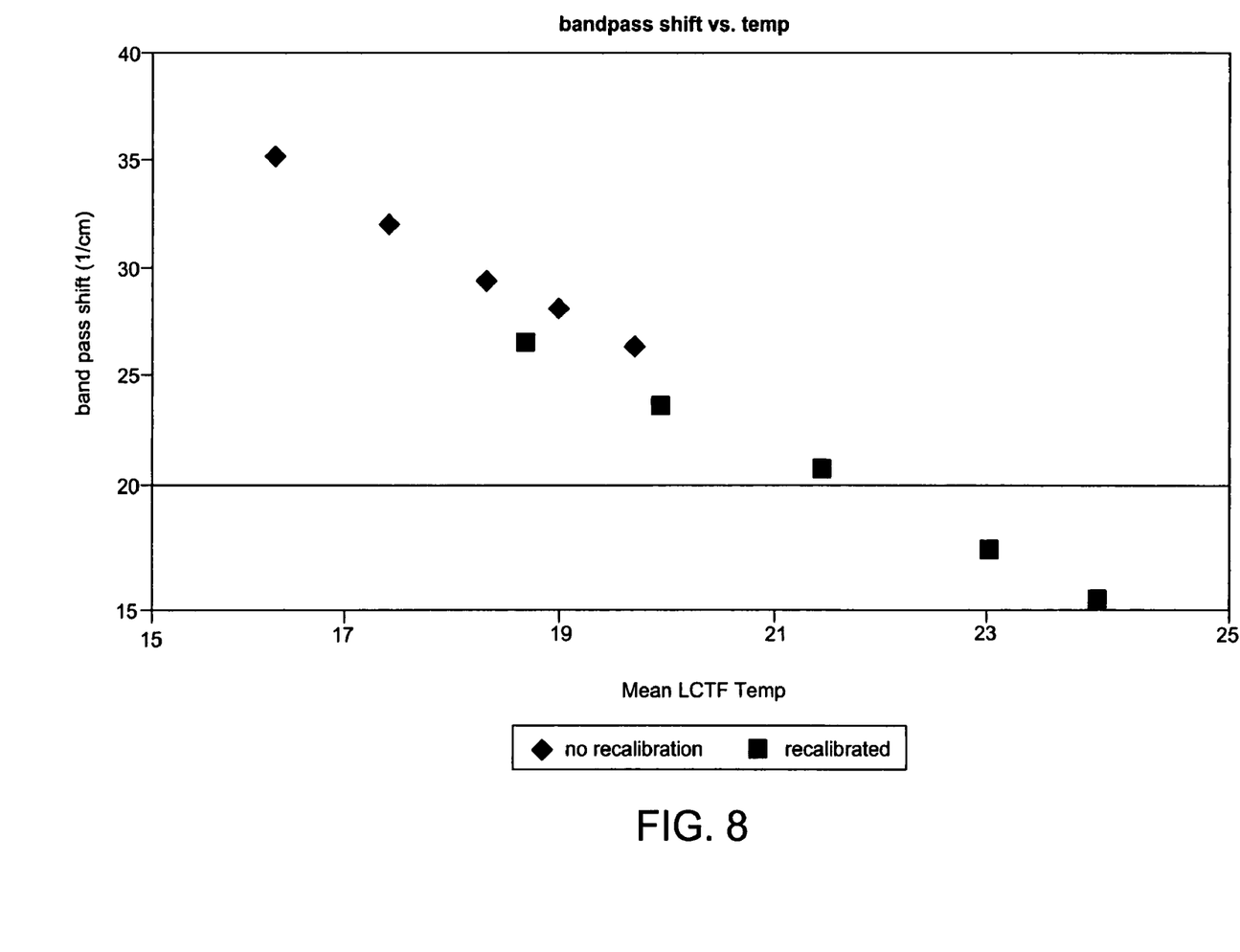
FIG. 8 shows bandpass shift versus temperature change.

Additional experiments were performed without recalibrating the LCTF between measurements. The results shown in FIG. 8 indicate that the recalibration has a minor effect on the correlation between bandpass shift and LCTF temperature. In FIG. 8, the diamond-shaped points represent data acquired with no calibration and the square-shaped data points represent data taken where LCTF was calibrated between measurements. These measurements show that although temperature variations of an LCTF instrument may be linear, the relationship varies changes from wavelength to wavelength.

According to one embodiment of the disclosure a method for defining an error offset is defined as a function of both temperature and wavelength (or bandpass wavelength). Thus, to characterize an LCTF device several measurements can be taken from the device at different temperatures and different wavelengths to establish a baseline for defining device offset as a function of wavelength and temperature. Once such baselines are established, a processor can be programmed to calculate device offset by receiving device temperature and the bandpass wavelength. In one embodiment, the instructions are recorded on a memory medium in a conventional software language such as C++.

The device temperature can be directly reported to the processor by a sensor positioned in or near the LCTF instrument. The operator can communicate the bandpass wavelength to the processor. The processor can then seek offset parameters from a database and calculate the offset. Once the device offset is determined, the operator can key in the desired bandpass wavelength and the processor will direct the LCTF to the actual bandpass wavelength using the offset.

In an exemplary embodiment, an LCTF device was tested at various temperatures and wavelengths to obtain the following baseline parameters:

$b_b$=2.7559
$m_b$=−0.00166
$b_m$=−0.09882
$m_m$=0.0000732

These parameters were found to be generally constant for the device under test. Using the baseline parameters, device offset can be determined according to the following relationships:

$$\text{Offset} = b_\lambda + m_\lambda T \quad (1)$$

$$m_\lambda = b_m + m_m \lambda \quad (2)$$

$$b_\lambda = b_b + m_b \lambda \quad (3)$$

In one embodiment, the processor can be configured to provide a user interface for receiving user's entry of the baseline parameters shown above and using these parameters to calculate the offset value. The processor can then receive the desired wavelength and, using the offset value, determine the instrument-specific or the filter's actual bandpass filter. Once this information is communicated to the LCTF, the device can produce a spectral image of the sample at the desired wavelength.

Figure 9:
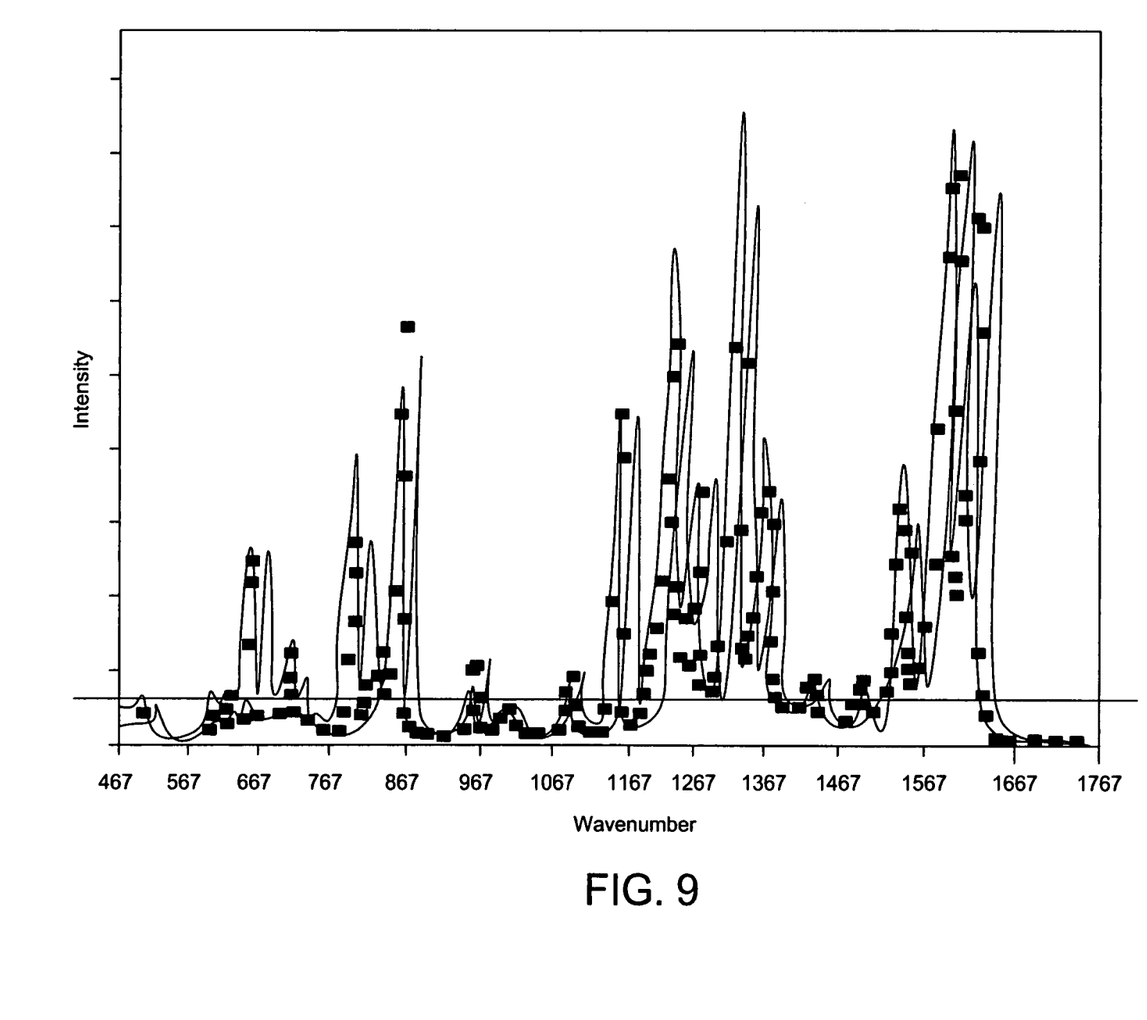
FIG. 9 shows spectra collected through an LCTF device with and without correction.

The exemplary embodiment disclosed above was implemented on a particular LCTF using an acetaminophen sample. The results are shown in FIG. 9. FIG. 9 shows spectra collected through the LCTF with and without the correction along with the dispersive spectrum for reference. Referring to FIG. 9, points indicate the spectrum taken through the LCTF and the solid lines represents dispersive spectrum. The broken lines represents the spectrum taken through the LCTF without correction. The data of FIG. 9 was acquired in series on the same field of view of the display system.

Figure 10:
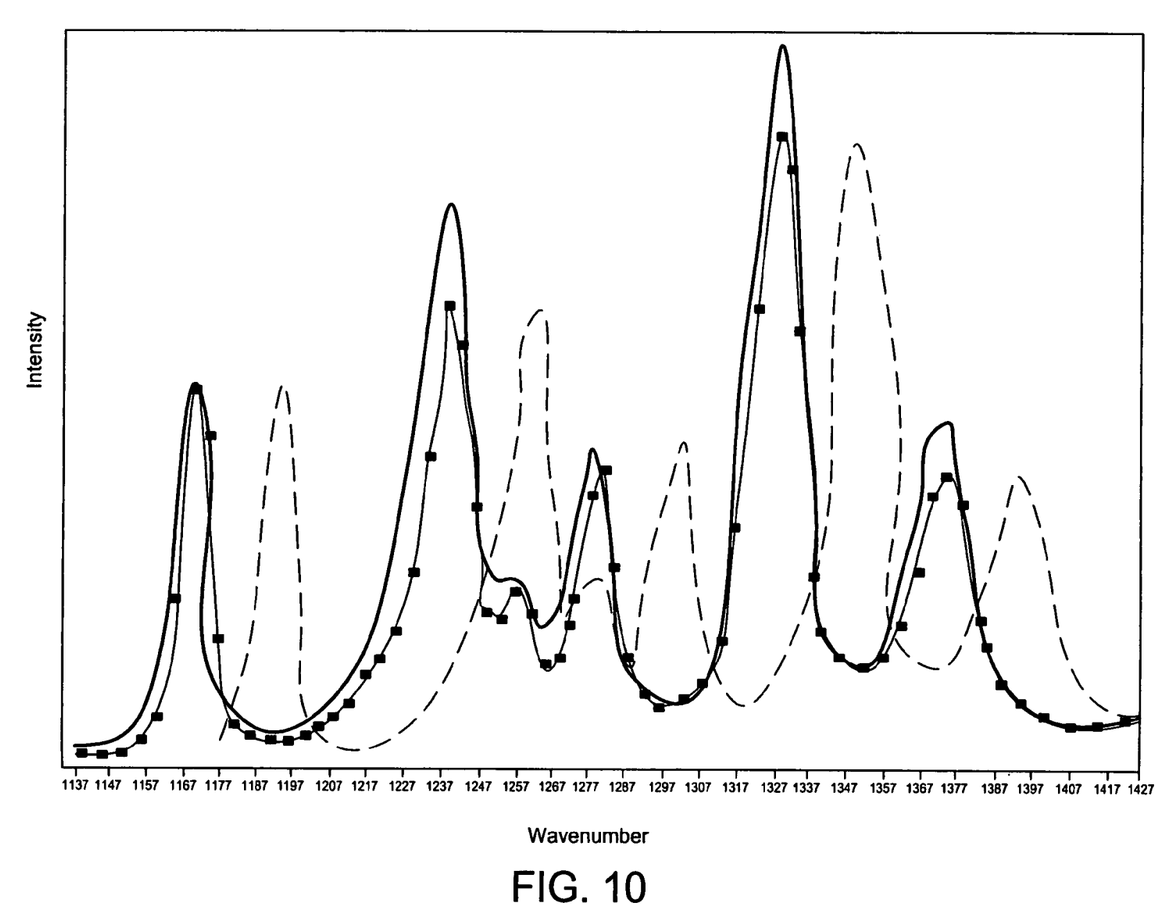
FIG. 10 shows a close-up of a portion of the spectra shown in FIG. 9.

FIG. 10 shows a close-up of a portion of the spectra shown in FIG. 9. Referring to FIG. 10, broken lines represent the spectrum taken through the LCTF and the solid lines represent the dispersive spectrum. The region shown in FIG. 10 is considered the fingerprint region of the sample.

Figure 11:
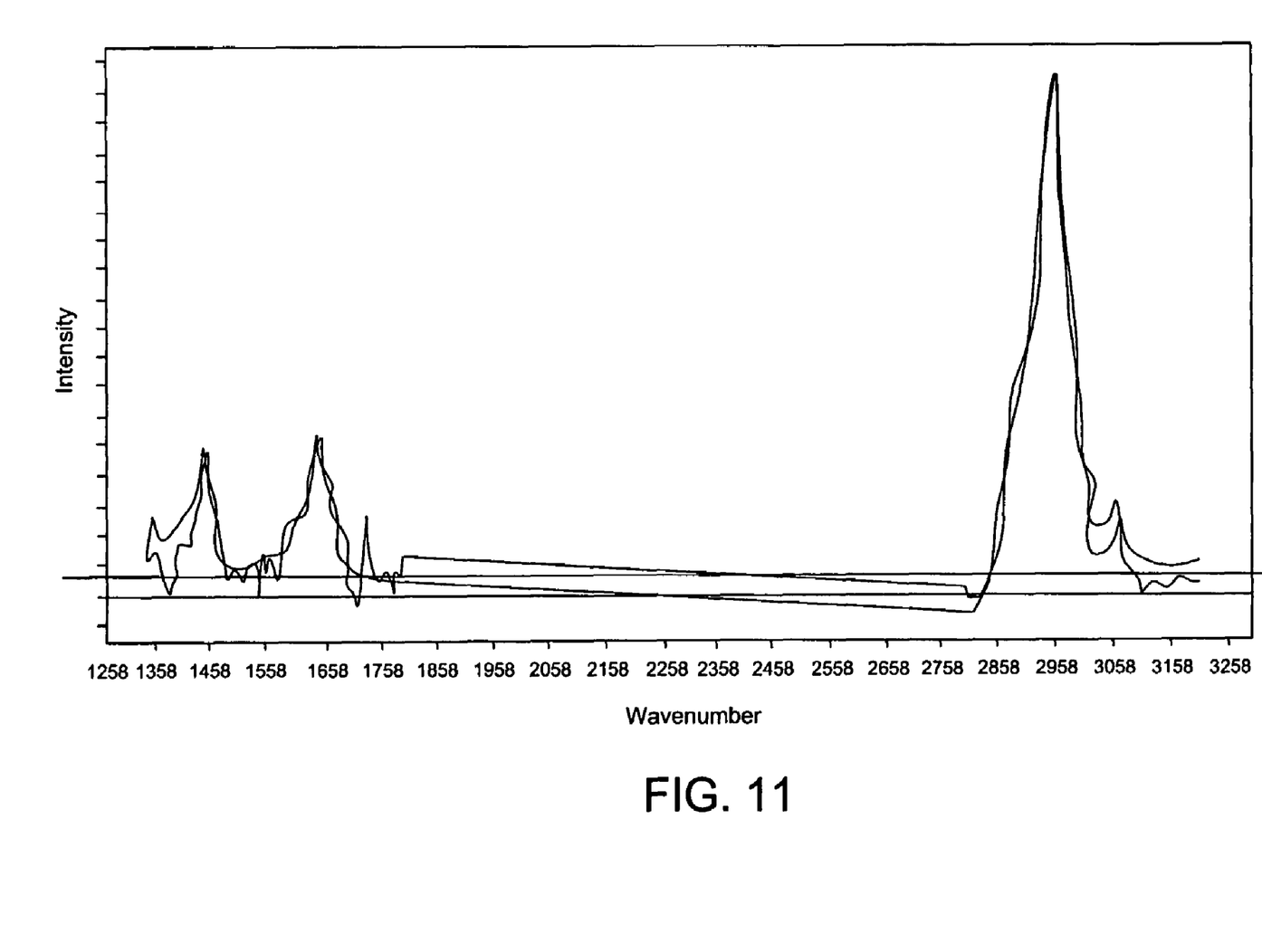
FIG. 11 shows the dispersive spectrum of a single cell from a breast cancer case taken with a dispersive spectrum and through an LCTF.

FIG. 11 shows the dispersive spectrum of a single cell from a breast cancer case taken with a dispersive spectrum and through an LCTF. In FIG. 10, the broken lines represent the dispersive spectrum of a single cell taken with a dispersive spectrometer. The solid line represents the spectrum through the LCTF. These spectra have been baseline corrected and the LCTF spectrum was corrected for the non-linear transmission modulation of the LCTF (white light correction) but no other processing was performed.

The principles disclosed herein were applied to a Raman imaging system having a liquid crystal tunable filter. A spreadsheet was developed to establish baselines based on measurements of the laser line and 2931 cm$^{-1}$ peak of an acetaminophen sample at several temperatures. The baseline parameters were fine-tuned by adjusting the parameter bb to make leaser peak align with 0 wavenumber. After fine-tuning the baseline parameters for the LCTF are:

$b_b$=1.4
$b_m$=−0.0068
$m_m$=−0.0001
$m_b$=−0.0004

To test the baseline information, a series of imaging experiments were performed on a silicon wafer using two Raman imaging system. Each experiment was an image over the laser peak at about 520 cm$^{-1}$ using the LCTF and imaging camera. Since imaging was not critical, the camera was binned (16×16) to facilitate rapid measurements. Each measurement included two images, one with the correction device turned on and the other with the correction device turned off. The images were taken one after another. For each pair of measurements the temperature of both LCTFs was recorded. It was observed that the temperature of the LCTF units varied only due to drift in the course of normal operation. The range of the drift was 2.4° C. Next, the mean spectra was interpolated together to compare the measured peak with and without the temperature turned on for a series of temperatures. FIG. 2 shows the variation of the silicon peak as measured through the LCTF with and without activating the temperature correction device disclosed herein. Referring to FIG. 2, it should be noted that the center of mass of the band shifts about 7 wavenumbers due to temperature and has a constant offset of at least 4 wavenumber leading to an error of between 4 and 11 wavenumbers depending on the temperature of the LCTF.

Figure 12:
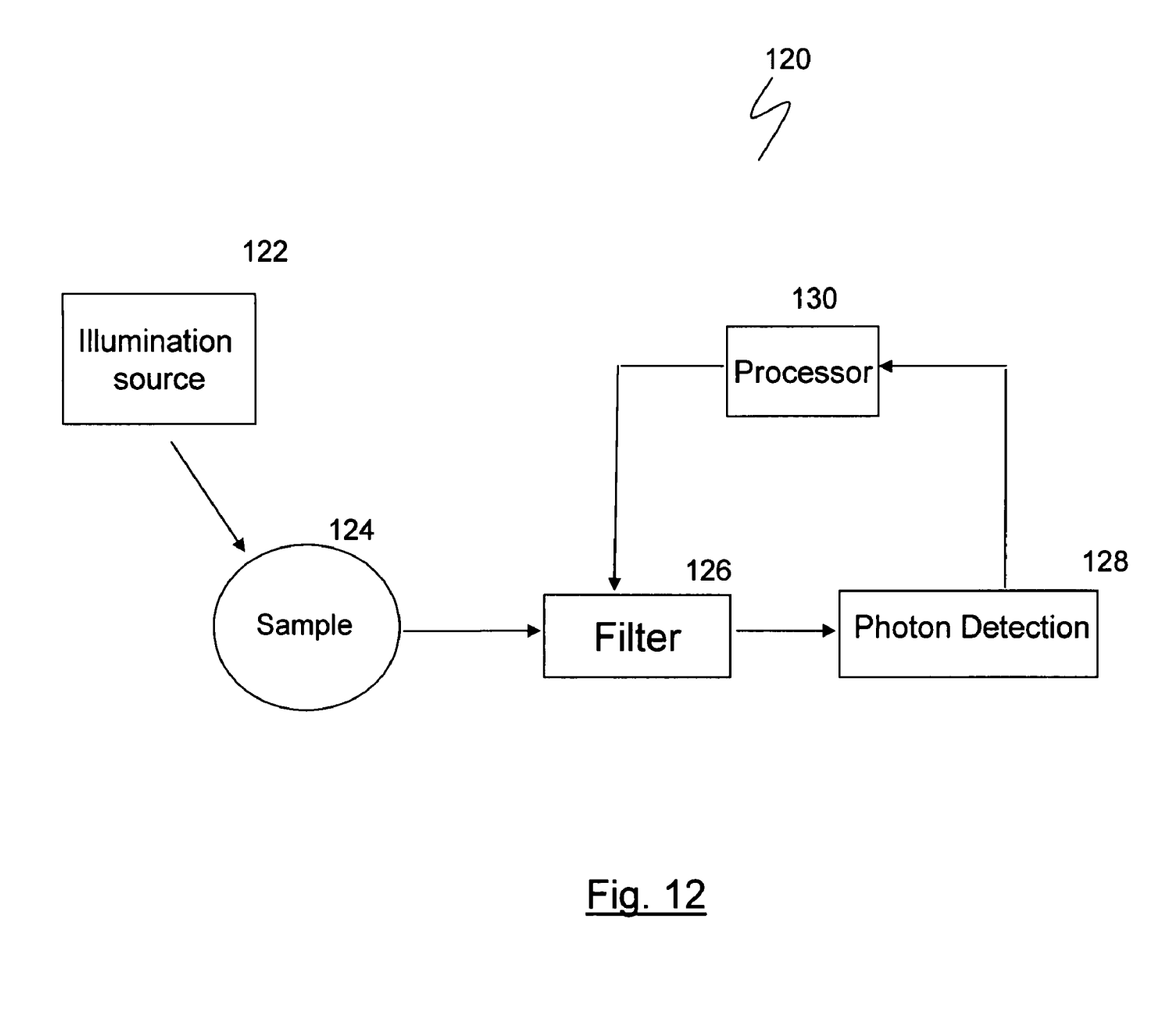
FIG. 12 is an exemplary system according to one embodiment of the disclosure.

FIG. 12 is an exemplary system according to one embodiment of the disclosure. A system 120 for correcting a determined wavelength of a photon may include a photon detection device 128 such as a CCD for determining a wavelength of a photon scattered from a sample 124 exposed to illuminating photons 122 and passed through a tunable filter 128. The tunable filter 126 can comprise an LCTF. A processor 130 programmed to correct the determined wavelength of said one photon as a function of the temperature of the tunable filter 126 and as a function of the bandpass set point of the tunable filter 126 can be included. To address temperature effect of the filter, the processor 130 can be programmed to execute a first set of instructions to determine an offset according to the equation:

$$\text{offset} = A + B\lambda + CT + D\lambda T$$

where: A, B, C, and D are each constants,
T is a temperature of the tunable filter, and
λ is a bandpass set point of the tunable filter 126.

Next, the processor can execute a second set of instructions adding the offset to the determined wavelength of said one photon.

According to another embodiment, a system for correcting a determined wavelength of a photon may include an LCTF for receiving photons scattered by a sample when exposed to illuminating photons and passing ones of said scattered photons that have a wavelength within a predetermined wavelength band; a charge-coupled device for determining a wavelength of one of said passed scattered photons; and a processor programmed to correct the determined wavelength of said one photon as a function of the temperature of the tunable filter and as a function of the bandpass set point of the tunable filter.

In another embodiment, the disclosure concerns an apparatus having a tunable filter for receiving photons scattered by a sample when exposed to illuminating photons. The tunable filter can be configured to block certain scattered photons that have a wavelength not within a predetermined wavelength band. The apparatus may also include a photon CCD for determining a wavelength of the scattered photons that is not blocked by said tunable filter. Finally, the apparatus may also include a processor programmed to correct the determined wavelength of said one photon as a function of the temperature of the tunable filter and as a function of the bandpass set point of the tunable filter. The processor can be coupled to a memory device for receiving instructions. The processor may also communicate with a database for storing or retrieving information relating to its operation.

Although the disclosure has been described with reference to specific exemplary embodiments discussed and illustrated herein, it should be noted that the principles of the disclosure are not limited thereto and include any permutation or modification thereto.

What is claimed is:

1. A method for correcting a determined wavelength of a photon, the method comprising the steps of:
   determining a wavelength of a photon scattered from a sample exposed to illuminating photons and passed through a liquid crystal tunable filter; and
   correcting the determined wavelength with a programmed processor of said one photon as a function of the temperature of the tunable filter and as a function of the bandpass wavelength of the liquid crystal tunable filter to obtain a corrected wavelength for the photon.

2. The method of claim 1 wherein the step of correcting the determined wavelength comprises the steps of:
   determining an offset according to the equation:

$$\text{offset} = A + B\lambda + CT + D\lambda T$$

where: A, B, C, and D are each constants,
   T is a temperature of the tunable filter, and
   λ is a bandpass set point of the liquid crystal tunable filter;
   and
   adding the offset to the determined wavelength of said one photon.

3. A method for correcting a determined wavelength of a photon, the method comprising the steps of:
   receiving at a liquid crystal tunable filter photons scattered by a sample when exposed to illuminating photons and passing ones of said scattered photons that have a wavelength within a predetermined wavelength band;
   for one of said passed scattered photons, determining a wavelength of said one photon at a photon detecting device; and
   correcting the determined wavelength with a programmed processor of said one photon as a function of the temperature of the liquid crystal tunable filter and as a function of a bandpass wavelength of the liquid crystal tunable filter to obtain a corrected wavelength for the photon.

4. The method of claim 3 wherein the step of correcting the determined wavelength comprises the steps of:
   determining an offset according to the equation:

$$\text{offset} = A + B\lambda + CT + D\lambda T$$

where: A, B, C, and D are each constants,
   T is a temperature of the liquid crystal_tunable filter, and
   λ is a bandpass set point of the liquid crystal_tunable filter;
   and
   adding the offset to the determined wavelength of said one photon.

5. A method for correcting a determined wavelength of a photon, the method comprising the steps of:
   receiving at a liquid crystal_tunable filter photons scattered by a sample when exposed to illuminating photons and blocking ones of said scattered photons that have a wavelength that is not within a predetermined bandpass of the liquid crystal tunable filter;
   for one of said scattered photons not blocked by the liquid crystal tunable filter, determining a wavelength of said one photon at a photon detecting device; and
   correcting the determined wavelength of said one photon with a programmed processor as a function of the temperature of the liquid crystal tunable filter and as a function of the bandpass wavelength_of the liquid crystal tunable filter_to obtain a corrected wavelength for the photon.

6. The method of claim 5 wherein the step of correcting the determined wavelength comprises the steps of:
determining an offset according to the equation:

$$\text{offset} = A + B\lambda + CT + D\lambda T$$

where: A, B, C, and D are each constants,
T is a temperature of the liquid crystal tunable filter, and
$\lambda$ is a bandpass set point of the liquid crystal tunable filter;
and
adding the offset to the determined wavelength of said one photon.

7. A method for determining a corrected wavelength of a photon scattered from a sample, the method comprising the steps of:
exposing a sample to illuminating photons;
receiving at a liquid crystal tunable filter photons scattered by the sample;
detecting at a photon detecting device one of the scattered photons that is in a predetermined wavelength band;
determining a wavelength of the detected photon; and
modifying the determined wavelength with a programmed processor as a function of the temperature of the tunable filter and as a function of a bandpass set point of the liquid crystal tunable filter to thereby determine a corrected wavelength of the detected photon to obtain a corrected wavelength for the photon.

8. The method of claim 7 wherein the step of modifying the determined wavelength comprises the steps of:
determining an offset according to the equation:

$$\text{offset} = A + B\lambda + CT + D\lambda T$$

where: A, B, C, and D are each constants,
T is a temperature of the liquid crystal tunable filter, and
$\lambda$ is a bandpass set point of the liquid crystal tunable filter;
and
adding the offset to the determined wavelength of said one photon.

9. A system for correcting a determined wavelength of a photon, comprising:
a photon detection device for determining a wavelength of a photon scattered from a sample exposed to illuminating photons and passed through a liquid crystal tunable filter; and
a processor programmed to correct the determined wavelength of said one photon as a function of the temperature of the liquid crystal tunable filter and as a function of the of a bandpass set point of the liquid crystal tunable filter.

10. The system of claim 9 wherein the photon detection device is a charge-coupled device.

11. The system of claim 9 wherein the processor program comprises:
a first set of instructions to determine an offset according to the equation:

$$\text{offset} = A + B\lambda + CT + D\lambda T$$

where: A, B, C, and D are each constants,
T is a temperature of the liquid crystal tunable filter, and
$\lambda$ is a bandpass set point of the liquid crystal tunable filter;
and
a second set of instructions for adding the offset to the determined wavelength of said one photon.

12. A system for correcting a determined wavelength of a photon, comprising:
a liquid crystal tunable filter for receiving photons scattered by a sample when exposed to illuminating photons and passing ones of said scattered photons that have a wavelength within a predetermined bandpass wavelength band;
a photon detecting device for determining a wavelength of one of said passed scattered photons; and
a processor programmed to correct the determined wavelength of said one photon as a function of the temperature of the liquid crystal tunable filter and as a function of the bandpass wavelength set point of the liquid crystal tunable filter.

13. The system of claim 12 wherein the photon detection device is a charge-coupled device.

14. The system of claim 12 wherein the processor program comprises:
a first set of instructions to determine an offset according to the equation:

$$\text{offset} = A + B\lambda + CT + D\lambda T$$

where: A, B, C, and D are each constants,
T is a temperature of the liquid crystal tunable filter, and
$\lambda$ is a bandpass set point of the liquid crystal tunable filter;
and
a second set of instructions for adding the offset to the determined wavelength of said one photon.

15. A system for correcting a determined wavelength of a photon, comprising:
a liquid crystal tunable filter for receiving photons scattered by a sample when exposed to illuminating photons and blocking ones of said scattered photons that have a wavelength not within a predetermined bandpass wavelength band;
a photon detecting device for determining a wavelength of one of said scattered photons that is not blocked by said liquid crystal tunable filter; and
a processor programmed to correct the determined wavelength of said one photon as a function of the temperature of the tunable filter and as a function of the bandpass set point wavelength of the liquid crystal tunable filter.

16. The system of claim 15 wherein the photon detection device is a charge-coupled device.

17. The system of claim 15 wherein the processor program comprises:
a first set of instructions to determine an offset according to the equation:

$$\text{offset} = A + B\lambda + CT + D\lambda T$$

where: A, B, C, and D are each constants,
T is a temperature of the liquid crystal tunable filter, and
$\lambda$ is a bandpass set point of the liquid crystal tunable filter;
and
a second set of instructions for adding the offset to the determined wavelength of said one photon.

18. A system for determining a corrected wavelength of a photon scattered from a sample, comprising:
- a sample exposed to illuminating photons;
- a liquid crystal tunable filter which receives photons scattered by the sample;
- a photon detecting device which detects one of the scattered photons that is in a predetermined bandpass wavelength band;
- a processor which is programmed to determine a wavelength of the detected photon and to modify the determined wavelength as a function of the temperature of the liquid crystal tunable filter and as a function of the bandpass wavelength set point of the liquid crystal tunable filter to thereby determine a corrected wavelength of the detected photon.

19. The system of claim 18 wherein the photon detection device is a charge-coupled device.

20. The system of claim 18 wherein the processor program comprises:
- a first set of instructions to determine an offset according to the equation:

$$\text{offset} = A + B\lambda + CT + D\lambda T$$

where: A, B, C, and D are each constants,
- T is a temperature of the liquid crystal tunable filter, and
- $\lambda$ is a bandpass set point of the liquid crystal tunable filter;

and
a second set of instructions for adding the offset to the determined wavelength of said one photon.

* * * * *